Figure 9:
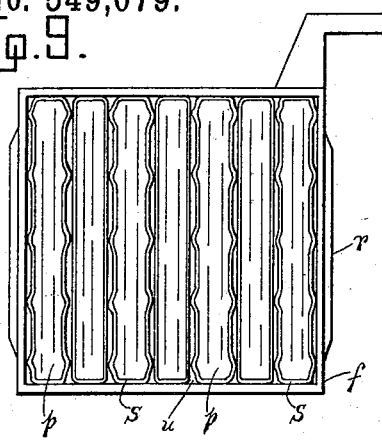

(No Model.) 2 Sheets—Sheet 1.
J. J. ROONEY.
SECONDARY BATTERY GRID AND PLATE AND METHOD OF PREPARING GRIDS.
No. 549,079. Patented Oct. 29, 1895.
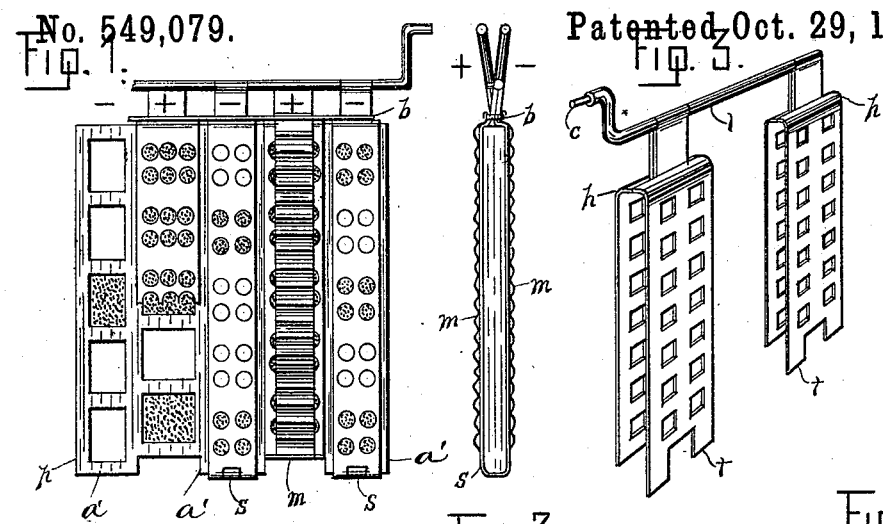
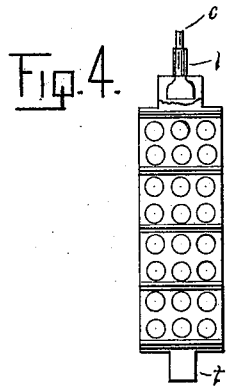
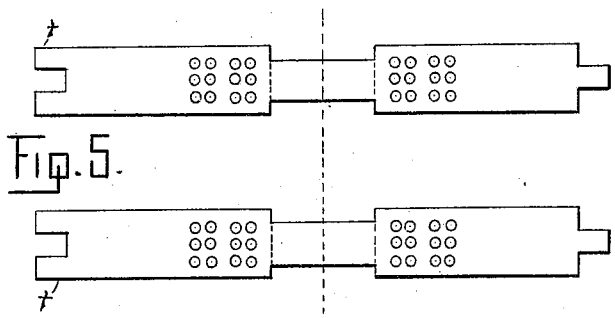
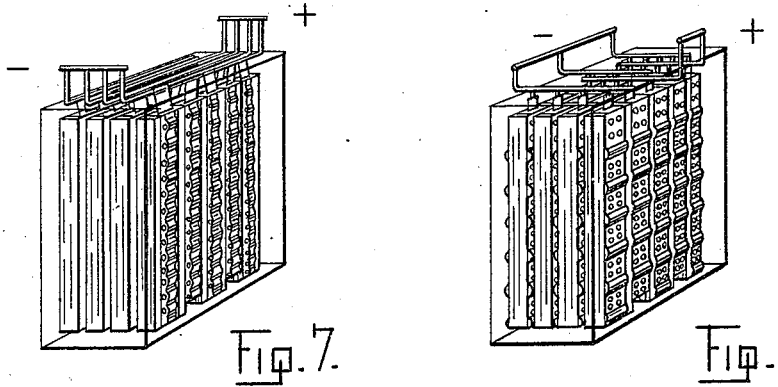
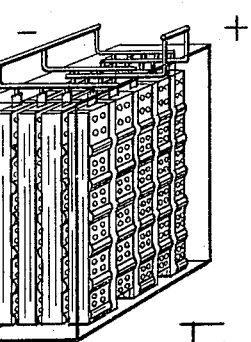
WITNESSES:
Thomas Ewing, Jr.
Chas. F. Bishop.
INVENTOR
John J. Rooney, (No Model.) 2 Sheets—Sheet 2.

J. J. ROONEY.
SECONDARY BATTERY GRID AND PLATE AND METHOD OF PREPARING GRIDS.

No. 549,079. Patented Oct. 29, 1895.

WITNESSES: INVENTOR
Thomas Ewing Jr. John J. Rooney
Chas. F. Bishop

ANDREW B.GRAHAM. PHOTO-LITHO. WASHINGTON, D.C.

UNITED STATES PATENT OFFICE.

JOHN J. ROONEY, OF BROOKLYN, NEW YORK.

SECONDARY-BATTERY GRID AND PLATE AND METHOD OF PREPARING GRIDS.

SPECIFICATION forming part of Letters Patent No. 549,079, dated October 29, 1895.

Application filed July 22, 1895. Serial No. 556,680. (No model.)

*To all whom it may concern:*

Be it known that I, JOHN J. ROONEY, a citizen of the United States of America, residing at Brooklyn, Kings county, New York, have invented certain new and useful Improvements in Secondary-Battery Grids and Plates and Methods of Preparing the Grids, of which the following is a specification.

One object of my invention is to produce a secondary battery made up of plates so formed that each plate may be placed directly upon the bottom of the containing vessel without the use of supporting-frames or other means devised to raise the plates above the bottom to prevent short-circuiting.

Another object of my invention is to construct positive or negative plates, so that the greatest expansion of the active material, instead of being in the direction of the flow of the current as it is in the usual series of parallel positive and negative plates, shall be at right angles thereto.

A third object of my invention is to reduce the weight of the batteries without impairing their efficiency and durability.

With these objects in view I have invented the improvements herein described, which consist, broadly, in a secondary battery made up of plates having non-conducting and preferably paper grids, with conductors preferably of rolled sheet-lead brought into contact with rows of active material, or material to become active, which I call "absorptive" material, the plates being provided with both positive and negative conductors, which are laid, say, vertically along the grid, the perforations in the vertical, positive, and negative rows lying in different horizontal layers or planes. I call a plate with both positive and negative conductors a "composite" plate. By "positive" conductors I mean those that electrically connect the pellets of absorptive material intended for the positive rows, electrodes, or elements of the cell. Similarly the negative conductors are those connecting the pellets of the negative rows. I prefer to use for the grid compressed or press-board paper with the sizing removed, as set forth in my application filed April 1, 1895, Serial No. 543,939.

My invention further consists in a new method of preparing the grid and in the product resulting therefrom.

Figure 12:
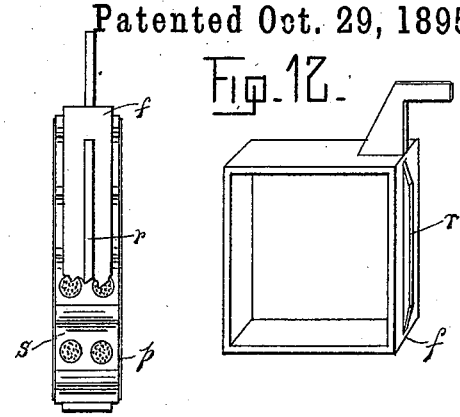
Figure 11:
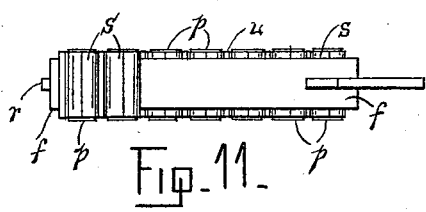
Figures 10, 16:
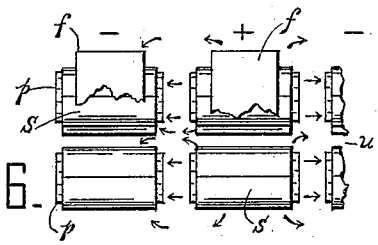
Figure 14:
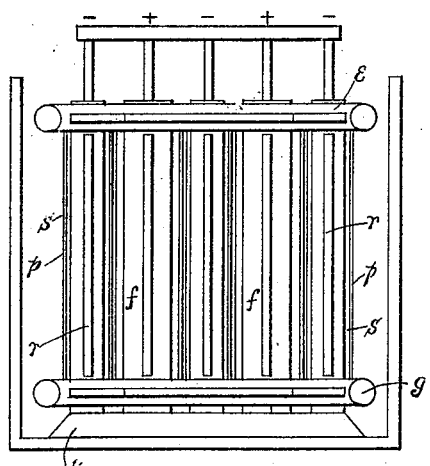
Figure 15:
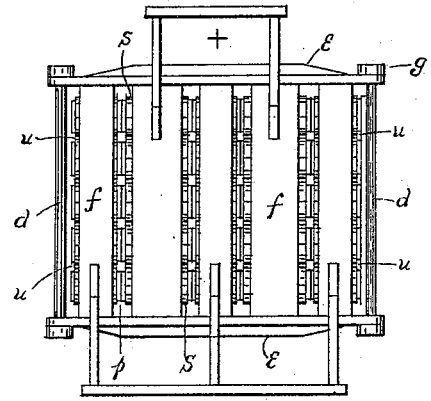
Figure 13:
Figure 17:
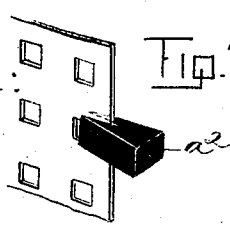

In the accompanying two sheets of drawings, which form a part of this specification, Figure 1 is a side view of my composite plate. Fig. 2 is an edge view. Fig. 3 is a perspective view of two perforated conductors electrically connected and ready to be attached to the positive rows of absorptive material. Fig. 4 is a crimped conductor, partly broken away at the top, and is a modified form. Fig. 5 is a plan of two conductors before bending, and shows the method of soldering them to a connecting-wire. Fig. 6 shows a plan of the connecting-wire. Fig. 7 shows in perspective a cell having four composite plates with celluloid separators and one method of connecting the plates. Fig. 8 shows in perspective a cell, the plates of which have crimped or corrugated conductors, and another method of connecting the cell. Fig. 9 is a side view of a plate to be used as a positive or a negative element or electrode. Fig. 10 is an edge view. Fig. 11 is a top view. Fig. 12 is a perspective view of the containing-case. Fig. 13 shows partly the plan of the perforated support of insulating material. Fig. 14 is an end view of a cell containing five elements of this construction. Fig. 15 is a top view. Fig. 16 is an enlarged top view of the containing-cases and insulating-supports with conductors attached. Fig. 17 is a perspective view of an insulating-wedge.

In Fig. 1 extensions $a'$, which form footrests, are produced by suitably prolonging, preferably, the negative rows. When the conductors are attached, as alternate ones only rest upon the bottom of the vessel, and as these are of the same polarity, accumulations at the bottom cannot cause short-circuiting. This is also prevented between adjacent conductors on the same grid either by leaving sufficient space between them or sticking small V-shaped pieces $a^2$, of insulating material, upon the edges of the conductors. These conductors are illustrated in Figs. 3, 4, and 5. After being formed as shown in Fig. 5 with perforated end sections and a narrowed middle section, they are bent in the manner shown in Figs. 3 and 4, and are attached to wires in the manner shown in one of these figures. They are kept in contact with the absorptive material by being bent into shape to fit along the sides of the grids and clamp by fold-over tips $t$ on the ends, as shown in Fig. 1. It is not necessary to provide for very tight contact, because this is secured by packing the plates closely together in the battery vessel. By the expansion of the grid, of absorbent material, when placed in the liquid the plates become more tightly packed, and the conductors make better contact with the absorptive material.

Fig. 3 shows two perforated conductors and a connecting-wire ready to be attached to the positive rows of active material. Three conductors will of course be required for the negative rows. It is evident that there can be as many conductors joined to one connecting-wire as required.

The connecting-wire shown in Fig. 6 is composed of two parts, a copper wire $c$ and an outer lead tubing $l$, which protects the copper from corrosion by the acid fumes or spray. The weight of the conductor is very much less than if a solid lead bar of equal conductivity were used.

The method of soldering or joining the conductors to the connecting-wire is as follows: The copper wire $c$ is covered with solder, preferably by dipping, and two or more pieces of lead tubing are placed in their proper positions, as shown, the wire having been first coated with resin dissolved in alcohol or with any other suitable flux. The space within the dotted lines of the conductor (shown in Fig. 6) having been previously coated with solder, the conductor is then bent over the wire overlapping the space between the sections of tubing. By applying heat derived from heated copper blocks having the proper configuration, all the soldered parts are firmly united, the copper wire conducting enough heat to solder the lead tubings firmly to itself. The shoulders $h\ h$ upon the conductors can be formed either before or after soldering all the parts together. The conductors can also be soldered to the connecting-wire without the use of lead tubing. As an additional protection other than that afforded by the coating of solder, the entire upper portion, as far as the shoulders, can be dipped into a solution of rubber and benzine or other rubber solvent. The end of the wire can be left uncoated by bending, so that it will project above the level of the solution, and then rebent into place.

In the modified form (shown in Fig. 4) of conductor and connecting wire, one end of the latter is flattened out to increase the surface. The straight end of the wire may be pushed through the lead conductor, or the latter, if heavy, may be provided with a suitable perforation.

In order to prevent the plates from packing so closely as to cut off circulation of the liquid, a corrugated ribbon $m$, preferably of celluloid, which may be perforated, the two ends of which are fastened at the top of the plate to the band $b$, also of insulating material, is used as a separator between adjacent plates, Figs. 1, 2, and 7. The corrugations are made deep enough to allow the escape of gas and leave a layer of electrolyte between adjacent plates, thus affording other paths for the electric current than through the paper walls. This separator also serves to keep the plates in position and the conductors firmly pressed against the active material. The separator is folded over the plate just as the conductor is folded. Only alternate plates need separators or crimped or corrugated conductors. If the walls of the vessel are flat, the two end plates can press against them, or a number of plates can be formed together by suitably bolting them together between rigid end pieces. The celluloid separators can be dispensed with by suitably corrugating the conducting-strips, as shown.

In Figs. 9, 10, 11, 14, and 15 are shown in various views a construction in which a number of small elements or sections of like polarity are all set within a common support, such as is illustrated in Fig. 12. The plate shown in Fig. 9 consists of a number of diminutive plates, sections, or elements set edgewise in a containing-case. Each section or element consists of a perforated support of porous insulating material $p$, active material filling the perforations and a perforated conductor making contact with the active material. The conductor completely surrounds the support $p$, being folded around it. The conductor on every other section is corrugated, thereby leaving clear spaces between the sections and allowing the electrolyte to circulate through the plate.

The containing-case $f$ is preferably of cast lead or lead alloy, provided with a connecting lug and ribs $r$. The sections are fastened in the frame in such a manner that good contact is made between the conductors $s\ s$ and the frame, for the frame in bracing them is a plane, which is at right angles to the current-flow in the completed battery.

In Fig. 16, taking the two sections of the positive plate, the greatest expansion of the active material will be at right angles to the current-flow, as indicated by the arrow-heads. As the sections are confined within a frame, distortion and loss of contact is prevented. When the plates are arranged closely together, owing to the clear spaces $u$ between the sections of the plates, the circulation of the liquid and the escape of gas is not impeded. It is seen that these plates are arranged in the same manner as in the usual construction, the direction of the current being at right angles to the plates, but parallel to the sections. As the conducting-strips $s\ s$ are not so wide as the supports, short-circuiting does not take place by packing the plates closely together.

In Fig. 15 are shown two positive and three negative plates clamped together by the bolts $d$, nuts $g$, and ribbed cross-pieces $e$. The plates are placed edge on, so that the different sections extend in parallel straight lines, leaving clear spaces, as previously explained. It is plain that the sections could be so constructed that the metallic conductors would not be directly in the electrolyte. For example, that might be passed through the band of the supports, as described in my application, Serial No. 543,939, filed April 1, 1895. As soon as one of these plates, if prepared in the manner hereinafter described, is immersed, the absorption of the liquid by the paper, and also the accumulation of the gases within the walls of the grid, tend to force the conductors out and cause bad contact or loss of contact with the absorptive material. The direction of greatest expansion of the absorptive material is at right angles to the direction of the current-flow. (See Fig. 16.) This expansion of the absorptive material forces the conductors away from the grids, but without causing any loss of contact. The expansion of the grid and the active material tends to distort the plate, and unless proper provision is made will cause it to bulge. The conductors can be made strong and heavy enough to resist these pressures, but this increases the weight of the cell. By my construction I take advantage of these pressures to keep the plates in shape without using heavy conductors, and as the plates are arranged with conductors of like polarity facing or opposite each other no short-circuiting can take place by reason of buckling or any dislocation of absorptive material or for other like cause.

It is evident that with plates like those shown in Fig. 1 both positive and negative elements must be lifted from the liquid together, as they are on one grid; but with the arrangement shown in Fig. 9 the positive and negative plates can be removed separately.

If oxides of lead are employed as absorptive material, they may be applied either in a powdered state or in a liquid state. If they are to be applied as powder, the grid is first saturated with dilute sulphuric acid or a solution of sulphate of magnesia and then laid upon a flat board. Each row of perforations is then filled with the proper powdered oxides and the whole compressed by suitable means, thereby squeezing the liquid from the paper. The liquid is immediately absorbed by the active material, enabling it to set and become hard. If used in a liquid form, it is best to have the paper damp. The oxides are then brought to a paint-like consistency by mixing with a suitable solution and poured into the perforations. The superfluous solution is quickly absorbed by the paper, leaving the active material in a condition to dry and set rapidly. In both cases, on drying, the paper shrinks and leaves the pellets of absorptive material sticking above its surface, or in other words, in relief. The conductors are then put in place and properly fastened.

Lead may be deposited electrolytically in the perforations from a suitable solution. The conductors may be placed on the grid either before or after the lead has been deposited. In either case the grid is placed in the lead-bath, preferably horizontally. A number of metallic points should project into the perforations constituting the cathode, the anode consisting of a sheet of lead. Owing to the great density of the current upon these points the lead is rapidly deposited. Upon the completion of the process the plate is removed from the solution and compressed, compacting the electrolytic lead and squeezing the solution from the paper. The plate is then immersed in a solution of sulphuric acid and water and an electric current passed so as to transform spongy lead in alternate rows into peroxide of lead.

The paper used is a compressed paper, such as press-board or binders' board. It is hard, dense, and light. It is first perforated to provide the pockets for the absorptive material. After being perforated the paper is freed from resinous and other gummy matter constituting the sizing. This reduces the paper to the vegetable fiber, which forms its basis. To accomplish this it can be treated with a solution of sodium caustic for from twelve to twenty hours. This does not destroy the firmness of the paper. Either immediately or after the paper is dried it is immersed in dilute hydrochloric acid. When the resultant chemical reaction has ceased, the paper is thoroughly washed in water. This leaves the paper soft and pliable and much thicker than before, but otherwise it is in its original shape. Either before or after thus distending it by removing its sizing, and before or after perforating it, but preferably after both operations, the faces of the paper may be coated with vulcanized rubber in the manner now to be described, in order to increase its durability and strength.

The paper grids are surrounded by an envelope of vulcanized rubber or gutta-percha, which covers both faces and the outer edges, the faces of the interior walls of the perforations being left unchanged. This can be accomplished by coating those parts of the grids to be protected with a solution of rubber in spirits of turpentine or petroleum and dusting powdered sulphur over them. Powdered sulphur can also be incorporated with the rubber solution in proportion, by weight, of about one part of sulphur to twelve parts of rubber. This is applied to the grid as already described, dispensing with the dusting. The grids are then placed in an oven and subjected for several hours to an elevated temperature of 300° to 320° Fahrenheit until the vulcanizing process is completed. The coating or envelope can be made of any depth desired by repeating the operation one or more times after drying the coating last laid on.

Though I am the inventor thereof, I do not claim in this application the methods of coating the paper nor the paper when so coated, but claim it only as an element of the secondary plate.

Having now fully described my invention, what I claim, and desire to secure by Letters Patent of the United States, is—

1. A composite secondary battery plate consisting of a grid of non-conducting material, vertical rows of perforations therein, the material in which are alternate rows, having extensions to form foot-rests, absorptive material filling the said perforations, alternate positive and negative conductors each in contact with the absorptive material in one row of perforations, substantially as described.

2. A composite secondary battery plate consisting of a grid of non-conducting material, rows of perforations therein, absorptive material filling the perforations, and alternate positive and negative conductors each in contact with the absorptive material in one row of perforations, the conductors being provided with separating corrugations, substantially as described.

3. A secondary battery which contains composite plates each made up of a grid of non-conducting material, rows of perforations therein, absorptive material filling the perforations, and alternate positive and negative conductors each in contact with the absorptive material in one row of perforations, corrugated and separating ribbons of celluloid between conductors of adjacent plates, substantially as described.

4. A copper wire having lead tubing soldered in sections along its length and a flexible conductor folded over the wire between these sections, substantially as described.

5. A secondary battery grid of paper coated with vulcanized rubber and having perforations to hold the absorptive material, substantially as described.

6. A secondary battery plate grid, composed of paper which is perforated and then distended, and coated with vulcanized rubber, substantially as described.

7. A secondary battery plate consisting of a grid of perforated paper from which the sizing has been removed and which is coated with vulcanized rubber, absorptive material combined therewith, and one or more conducting plates or strips making contact with the absorptive material, substantially as described.

8. A composite secondary battery plate made up of a grid of perforated paper, from which the sizing has been removed and which is coated with vulcanized rubber, absorptive material filling the perforations and sets of conductors insulated from each other, in contact with the absorptive material, substantially as described.

9. The method of preparing secondary battery plates, which consists in perforating a sheet of compressed paper, reducing it to vegetable fiber by removing its sizing, coating its faces with vulcanized rubber, and then filling the perforations with absorptive material and attaching conductors, substantially as described.

Signed by me in New York this 20th day of July, 1895.

JOHN J. ROONEY.

Witnesses:
THOMAS EWING, Jr.,
SAMUEL W. BALCH.